United States Patent
Muquet et al.

(10) Patent No.: US 9,077,601 B2
(45) Date of Patent: Jul. 7, 2015

(54) METHOD AND USER EQUIPMENT FOR CARRIER AGGREGATION

(71) Applicant: SEQUANS COMMUNICATIONS, Colombes (FR)

(72) Inventors: Bertrand Muquet, Saint Germain en Laye (FR); Mauricio Briceno, Paris (FR)

(73) Assignee: SEQUANS COMMUNICATIONS, Colombes (FR)

( * ) Notice: Subject to any disclaimer, the term of this patent is extended or adjusted under 35 U.S.C. 154(b) by 0 days.

(21) Appl. No.: 13/909,580

(22) Filed: Jun. 4, 2013

(65) Prior Publication Data

US 2013/0322575 A1 Dec. 5, 2013

(30) Foreign Application Priority Data

Jun. 4, 2012 (EP) ................................. 12305630

(51) Int. Cl.
*H04K 1/10* (2006.01)
*H04L 27/26* (2006.01)
*H04L 5/00* (2006.01)

(52) U.S. Cl.
CPC ............ *H04L 27/2647* (2013.01); *H04L 5/001* (2013.01)

(58) Field of Classification Search
CPC ...................... H04L 27/2647; H04L 25/03343; H04L 5/007; H04L 1/0618; H04L 1/06; H04B 3/32; H04N 5/4401
USPC .................................. 375/260, 267, 285, 316
See application file for complete search history.

(56) References Cited

U.S. PATENT DOCUMENTS

| 7,809,067 B2 * | 10/2010 | Razzell .......................... 375/260 |
| 8,503,546 B1 * | 8/2013 | Ashrafi .......................... 375/260 |
| 2002/0137464 A1 * | 9/2002 | Dolgonos et al. ............... 455/60 |
| 2007/0202816 A1 * | 8/2007 | Zheng ............................. 455/91 |
| 2008/0253277 A1 * | 10/2008 | Lee et al. ...................... 370/203 |
| 2009/0257533 A1 * | 10/2009 | Lindoff et al. ................ 375/344 |

FOREIGN PATENT DOCUMENTS

WO 2011036831 A1 3/2011

OTHER PUBLICATIONS

Crochiere R. E. et al.: "Multirate Digital Signal Processing", Jan. 1, 1983, Multirate Digital Signal Processing, Englewood Cliffs, Prentice-Hall, US, pp. 5-07, 28, XP002105684.
European Search Report and Written Opinion dated Nov. 1, 2012 for corresponding European Application No. 12 30 5630, filed Jun. 4, 2012.

* cited by examiner

*Primary Examiner* — Dac Ha
*Assistant Examiner* — Janice Tieu
(74) *Attorney, Agent, or Firm* — David D. Brush; Westman, Champlin & Koehler, P.A.

(57) ABSTRACT

User equipment is provided for receiving an OFDM signal. The user equipment includes a plurality of carrier processing chains and a carrier aggregation module, aggregating the signals received on each carrier processed by the plurality of carrier processing chains. The aggregation module delivers a set of aggregated signals of the plurality of carrier processing chains at the input of a Fast Fourier Transform module of a PHY layer processing subsystem of the user equipment. The Fast Fourier transform module is able to process a size of data according to a predetermined rate depending on the aggregated bandwidth of the set of aggregated signals of the plurality of carrier processing chains, and the carrier aggregation module includes at least one frequency shifter for frequency shifting carriers.

9 Claims, 8 Drawing Sheets

METHOD AND USER EQUIPMENT FOR CARRIER AGGREGATION

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to wireless transmission techniques.

More specifically, the disclosure relates to a method for transmitting data in multi wireless technologies environment. Among wireless technologies, the most recently deployed are LTE (for "Long Term Evolution") and WiMAX (for "Worldwide Interoperability for Microwave Access").

In particular, "Carrier aggregation" has been introduced in the release 10 of LTE in order to increase the throughput that a wireless mobile can experiment. The principle is that a User Equipment (UE) can transmit and receive on several wireless channels simultaneously instead of using a single channel.

As several scenarios can be considered, the reconfiguration of the carrier aggregation modules involves a lot of changes.

This disclosure provides a way to implement a flexible and efficient arrangement for carrier aggregation, avoiding the cost of other existing techniques.

BACKGROUND OF THE DISCLOSURE

1. Prior Art

Classically, a basic and natural arrangement for carrier aggregation aims at managing independently each channel using several independent PHY layers.

Figure 1A:
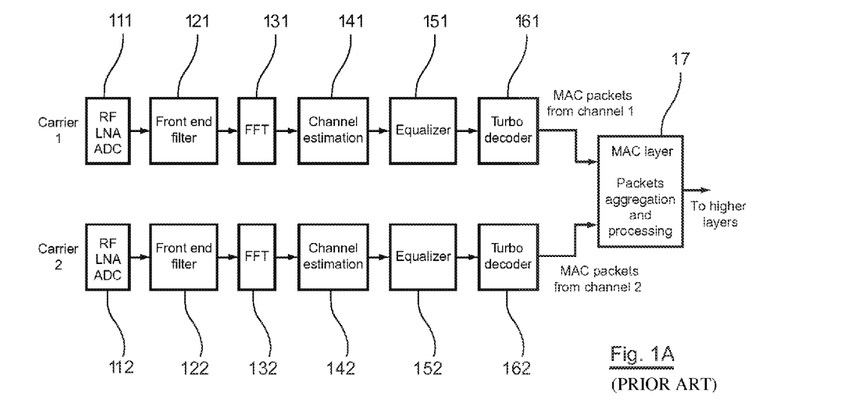
FIGS. 1A to 1C, already commented in relation to the prior art, discloses the classical and basic general arrangement for carrier aggregation and two variants.

A basic arrangement is for example illustrated by FIG. 1A in the case of two aggregated channels.

Considering the example of FIG. 1A, the basic arrangement implements a chain of modules for processing each channel. Each chain of modules comprises for example a first module (111, 112) comprising a receiving antenna and radio frequency (RF) means for processing the received analog signal comprising for example at least a low-noise amplifier LNA, and an analog-to-digital converter ADC, one or a plurality of filters and gain amplifiers, a second module (121, 122) comprising a waveshaping filter, a third module (131, 132) implementing a Fast Fourier Transform FFT managing the OFDM transmission, a fourth module (141, 142) for the channel estimation, which computes the channel information over the channel bandwidth, a fifth module (151, 152) comprising an equalizer, which extracts the useful carriers out of the N available at the FFT output and compensates for the channel distortion using the channel estimations and a sixth module (161, 162) comprising a turbo decoder.

In this example, the part of the chain comprising these six modules corresponds to the process that is implemented for each channel in the PHY layers and can be called the "front end" and delivers decoded data.

Note that in the following the terminology "front end" refers to the part of the chain of each channel that is upstream to the aggregation point. Consequently, the terminology "back-end" will refers to the part of the "aggregated" chain that is downstream to the aggregation point.

Figure 1B:
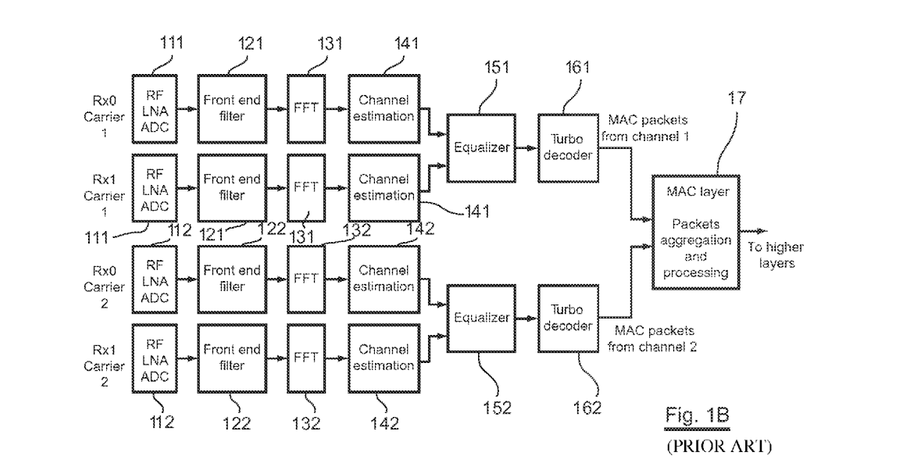

FIG. 1B represents more particularly, the arrangement of the prior art that is implemented in a classical LTE (or WiMAX) receiver using two antennas (Rx0 and Rx1). In this embodiment of the prior art, each carrier (carrier 1 and carrier 2) is processed by both antennas chain (Rx1 and Rx2). For each antenna and each carrier, the first to fourth modules are implemented. In the embodiment of the prior art represented by FIG. 1B two fifth modules (151, 152) comprising an equalizer, and two sixth modules (161, 162) comprising a turbo decoder are implemented to process all the data of carrier 1 received by both Rx0 and Rx1 on the one hand (151, 161), and on the other hand all the data of carrier 2 received by both Rx0 and Rx1 (152, 162).

Carrier 1 and carrier 2 of FIG. 1B related to the prior art are then aggregated in the MAC layer level 17.

Figure 1C:
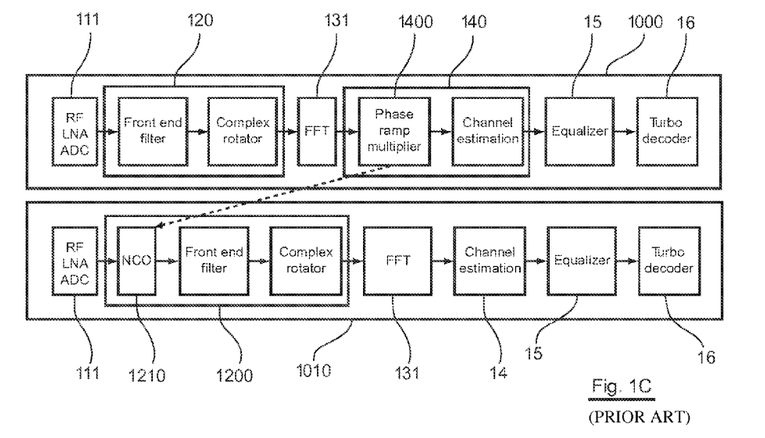

FIG. 1C is a detailed representation of two alternative embodiments (1000 and 1010) of the "front end" part of the classical and basic arrangement of the prior art for receiving an OFDM signal (one with a phase ramp multiplier 1400, the other with a numerically control oscillator 1210).

According to the first alternative 1000, the second module 120 comprises a front end filter, used to remove all the interference adjacent to the channel and a complex rotator, which compensates for the residual frequency offset, and the fourth module 140 comprises a phase ramp multiplier 1400, which compensates for the residual timing period offset in addition to the channel estimation means.

According to the second alternative 1010, the second module 1200 comprises a numerically controlled oscillator 1210 in addition to the front end filter and the complex rotator, which compensates for the residual frequency offset and/or the timing period offset, and the fourth module 14 comprises only the channel estimation means.

As illustrated by FIGS. 1A to 1C, according to the classic and basic arrangement for carrier aggregation, the aggregation is indeed then performed on the decoded data delivered by the front end at the MAC layer level 17.

As a result, considering the basic arrangement, the bandwidth corresponding to each channel is managed independently and separately using classical PHY layers arrangement, and the carriers of each channel are aggregated at the MAC layer level, i.e. the aggregation point is located in the MAC layer.

According to the release 10 of LTE, several scenarios of carrier aggregation can be implemented in order to permit the User Equipment (UE) to transmit and receive on several wireless channels simultaneously instead of using a single channel.

Figure 2:
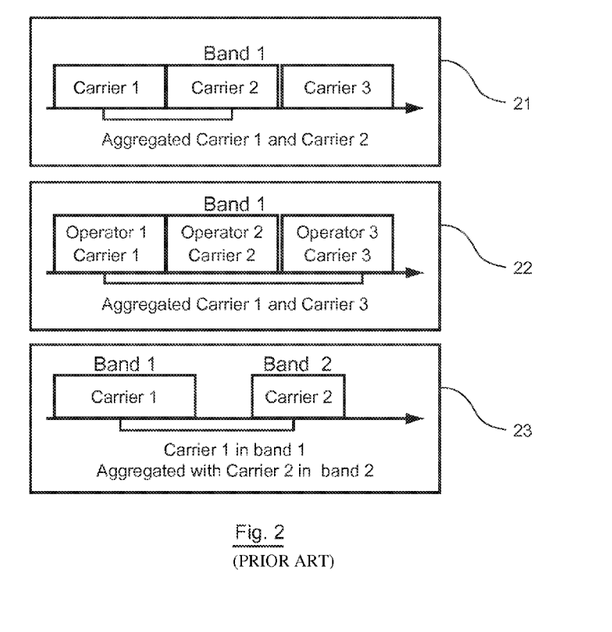
FIG. 2, already commented in relation to the prior art, discloses various carrier aggregation scenarios.

Several examples of scenarios are illustrated in the FIG. 2. Those examples are generic and applied to carrier aggregation in general.

Thus, for example in the first scenario 21, the user equipment uses two contiguous channels of the same bandwidth (e.g. 20 MHz) to sustain a maximum throughput as if it would be using a single 40 MHz channel.

In the second scenario 22, the user equipment uses two channels that are non contiguous but of same bandwidth.

In the third scenario 23, the mobile uses two channels that are non contiguous and of different bandwidths (BW) (e.g. 20 MHz and 5 MHz).

Another scenario (not represented) could consist in that the user equipment uses more than two channels (e.g. 20 MHz, 15 MHz and 5 MHz).

In addition, LTE defines several categories to specify the capability of performing carrier aggregation for a user equipment, which corresponds to the number of carriers that can be aggregated as well as the maximum aggregated bandwidth (defined in resource blocks (RB) which is a group of 12 carriers). These categories are summarized in the table below:

| Carrier Aggregation Bandwidth Class | Aggregated Transmission BW Configuration (in RB) | Number of aggregated carriers |
|---|---|---|
| A | ≤100 | 1 |
| B | ≤100 | 2 |
| C | 100-200 | 2 |

Some other classes D, E and F exist also and include more component carriers and possibly more than 200 aggregated RBs.

Thus, considering that various scenarios or carrier aggregation bandwidth class can be implemented, changing of scenario or even of carrier aggregation bandwidth class involves the change or adaptation of all the modules comprised in the front end of the PHY layers of the basic arrangement.

2. Prior Art Drawbacks

Thus a first disadvantage of the basic arrangement is its lack of "reconfigurability". This basic arrangement results indeed in dramatically multiplying the changes of every modules of the "front end" part of the chain in order to adapt to a change of scenario.

In addition, the basic arrangement involves a sufficient die size to support as many modules as it is required by the different scenarios or the different carrier aggregation bandwidth classes, which is not in line when considering that future user equipments always aim at saving area.

Another disadvantage of the basic arrangement is its cost: to support all the scenarios as described above, each module shall be dimensioned to support the worst scenario per carrier.

Moreover, it appears also that managing independently each channels using several independent PHY layers, is not even efficient in terms of power consumption. Indeed, the power consumption of all the PHY layers corresponds to the power consumption of one PHY layer times the number of channels. And in addition, the change of scenario leads to a new power consumption, which often involves great power consumption variations.

SUMMARY

The disclosure does not have the drawbacks of the prior art solution.

Indeed, the disclosure relates to a user equipment for receiving an OFDM signal, said user equipment comprising a plurality of carrier processing chains.

According to the disclosure, said user equipment comprises a carrier aggregation module, aggregating the signals received on each carrier processed by said plurality of carrier processing chains, said carrier aggregation module being implemented for delivering a set of aggregated signals of said plurality of carrier processing chains at the input of a Fast Fourier Transform module of a PHY layer processing subsystem of said user equipment, said Fast Fourier transform (FFT) module being able to process a size of data according to a predetermined rate depending on the aggregated bandwidth of said set of aggregated signals of said plurality of carrier processing chains, and said carrier aggregation module comprising at least one frequency shifter for frequency shifting carriers.

Thus, the disclosure proposes a way to be flexible and gives the capability to process a bandwidth B (e.g. 100 RB in LTE), permitting thus to perform carrier aggregation of an arbitrary number of carriers, while respecting that their total aggregated bandwidth is smaller or equal to B. It is therefore very suited to the LTE definition of class since LTE does not define at all the split between the aggregated carriers.

This is a clear advantage that can be highlighted using the following example: considering a total aggregated bandwidth of 20 MHz and the capability of the user Equipment to support any split within the aggregated bandwidth, the natural approach to use one baseband per aggregated carrier does not provide an optimal use of all PHY layer resources as each "per carrier" receiver chain has to be dimensioned to individually support the maximum individual bandwidth that can be used per carrier (in practice, this will likely be the total aggregated bandwidth). Indeed if it is desired to implement an arrangement able to support arbitrary splits between the aggregated bandwidth, for instance in the case of 20 MHz the following splits are used:

one unique carrier with a bandwidth equal to 20 MHz,
one carrier with a bandwidth equal to 15 MHz and one carrier with a bandwidth equal to 5 MHz,
one carrier with a bandwidth equal to 10 MHz and one carrier with a bandwidth equal to 10 MHz.

Then, according to the classical systems, it is necessary to have at least one PHY layer capable to support 20 MHz and a second PHY layer capable to support 10 MHz.

Besides, more than two carriers can be aggregated in LTE and carrier aggregations like 10 MHz+5 MHz+5 MHz have to be managed, calling for a flexible solution to avoid ending up with clumsy arrangements relying on more than two PHY layer chipsets with large die size/power consumption.

By moving the aggregation module in the PHY Layer, rather than in the MAC Layer as it is done in the prior art, the proposed disclosure permits then to make an efficient use of the total processing capability, by granting processing capability efficiently to the processing of the each carrier according to its bandwidth (BW). This results in saving of size and power consumption.

In the following of the specification, by "implemented" it is both referred to the meaning of "located", and "executed" or "putted in action".

According to a particular aspect of the disclosure, said carrier aggregation module comprises:
at least one oversampler for oversampling the received signal on each carrier,
an adder for adding signals received on each carrier, delivering said set of aggregated signals of said plurality of carrier processing chains.

According to a first embodiment, said carrier aggregation module comprises:
a number of oversamplers which is at least equal to the number of carriers to aggregate, each of said oversampler delivering an oversampled signal for each carrier;
a number of frequency shifters which is at least equal to the number of carriers to aggregate, each of said frequency shifter delivering a frequency shifted signal for each carrier from said corresponding oversampled signal of each carrier;
and said adder adds said shifted carriers and delivers a set of aggregated signals of said plurality of carrier processing chains, and said oversamplers, frequency shifters and adder process digital signals of each carrier.

In particular, said frequency shifters processing digital signal multiply the signal by a complex exponential.

According to a second embodiment said carrier aggregation module comprises:
  said adder which adds analog carriers, delivering a set of aggregated analog aggregated signals of said plurality of carrier processing chains,
  a digital to analog converter, delivering a set of digital aggregated signals of said plurality of carrier processing chains, and being able to process a bandwidth according to a predetermined rate ("mother rate") depending on the aggregated bandwidth of said set of aggregated signals of said plurality of carrier processing chains.

Thus, it is possible to reduce the number of digital converters.

According to a variant of said second embodiment, said carrier aggregation module comprises a number of frequency shifters, which is at least equal to the number of carriers to aggregate, each of said frequency shifters delivering a frequency shifted analog carrier to the adder.

According to a variant of said second embodiment, each of said frequency shifters is a mixer, which implements an analog shift.

Such a mixer implements an analog frequency shift multiplying the signal by two sinusoids in quadrature and then summing the result of these two multiplications.

According to a variant of said second embodiment, each of said frequency shifters is able to both implement an analog shift and convert a signal of a carrier to baseband.

Such a single frequency shifter permits to avoid the use of two mixers: one for frequency shifting and the other for converting a carrier to baseband.

According to another variant of said second embodiment, said carrier aggregation module comprises an RF switch, said RF switch having:
  as many inputs as a number of carrier to aggregate,
  one output for delivering said set of aggregated signals of said plurality of carrier processing chains.
said RF switch operating at a predetermined rate depending on the aggregated bandwidth of said set of aggregated signals of said plurality of carrier processing chains,
  and said RF switch being able to select one sample of one of said inputs according to a predetermined periodic sequence for building said output.

Thus, it is an alternative way to aggregate the analog signals of each carrier. Moreover, this variant of the second embodiment is easier to implement in practice since it requires less modification of the involved modules belonging to the "front end" or "back end" part.

The disclosure also relates to a method for receiving an OFDM signal implemented by a user equipment, said user equipment comprising a plurality of carrier processing chains.

According to this embodiment, said method comprises a carrier aggregation step, aggregating carriers of each carrier processed by said plurality of carrier processing chains, said carrier aggregation step comprising a least one sub-step for delivering a set of aggregated carriers at the input of a Fast Fourier Transform module of a PHY layer processing subsystem of said user equipment, said Fast Fourier transform (FFT) module being able to process a size of data according to a predetermined rate depending on the aggregated bandwidth of said set of aggregated signals of said plurality of carrier processing chains, and said carrier aggregation module comprising at least one frequency shifter for frequency shifting carriers.

In another aspect, the disclosure also relates to a computer program product downloadable from a communications network and/or stored on a computer-readable support and/or executable by a microprocessor, said computer program product comprising program code instructions for implementing a method for receiving an OFDM signal implemented by a user equipment, said user equipment comprising a plurality of carrier processing chains.

According to this embodiment, said computer program product comprising program code instructions for processing a carrier aggregation step, aggregating carriers of each carrier processed by said plurality of carrier processing chains, said carrier aggregation step comprising a least one sub-step for delivering a set of aggregated carriers at the input of a Fast Fourier Transform step of a PHY layer processing subsystem of said user equipment, said Fast Fourier transform (FFT) module being able to process a size of data according to a predetermined rate depending on the aggregated bandwidth of said set of aggregated signals of said plurality of carrier processing chains, and said carrier aggregation module comprising at least one frequency shifter for frequency shifting carriers.

BRIEF DESCRIPTION OF THE DRAWINGS

The proposed method is described in the following by way of examples in connection with the accompanying figures without limiting the scope of the protection as defined by the claim. The figures show.

DETAILED DESCRIPTION OF ILLUSTRATIVE EMBODIMENTS

1. Main Principles

As already explained above, the basic arrangement of the user equipments of the prior art are not suited when considering for example the saving area issue.

Figure 3:
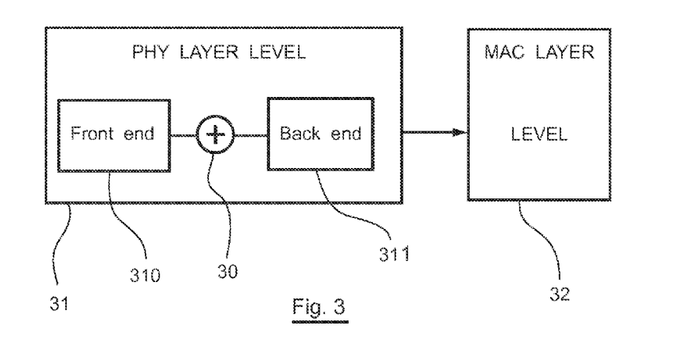
FIG. 3 represents the general principle of the disclosure.

The general principle of the present disclosure is represented by FIG. 3 and consists in performing the carrier aggregation sooner than at the MAC layer level 32, i.e., at the PHY layer level 31, which permits to reduce the die size and decrease the cost and the power consumption.

The classical arrangement is thus modified since the carrier aggregation point 30 is implemented in the PHY layer level 31 rather than at the MAC layer level 32. The proposed modified arrangement is able to manage efficiently several aggregated carriers delivered by a "front end" part 310 and to share all blocks from at least the FFT up to the logical channel decoders comprised at least in the "back end" part 311.

More precisely, moving the aggregation point from the MAC layer level 32 to the PHY layer level 31 requires a step based on the implementation of three different and independent additional steps:

- oversampling in order to fit the inputs of a single FFT module, which is able to manage all the aggregated carriers,
- a frequency shift permitting a properly carrier aggregation without overlapping, in other terms permitting to make the aggregated carriers adjacent,
- summing the shifted carriers in order to deliver an aggregation of carriers, which can be processed by a single "back end" processing chain.

According to the different embodiments described in the following, these three additional steps are always performed in the disclosure regardless of the order in which they are performed.

It is possible that the presented disclosure, applied for instance to LTE in the specification below, is also applicable to most OFDM systems and in particular to any scalable OFDM system such as WiMAX.

In the following, the disclosure is frequently exemplified using the specific case of LTE, bus as mentioned above the disclosure is not restricted to.

2. Description of a First Embodiment

Figure 4A:
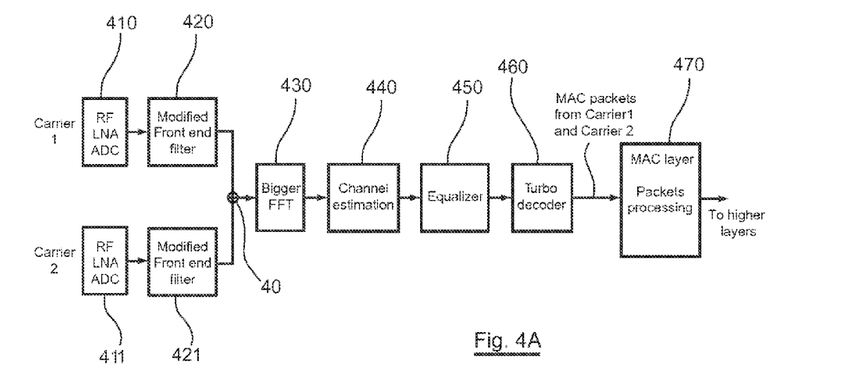
FIGS. 4A to 4C disclose the arrangement for carrier aggregation according to a first embodiment of the disclosure.
Figure 4B:
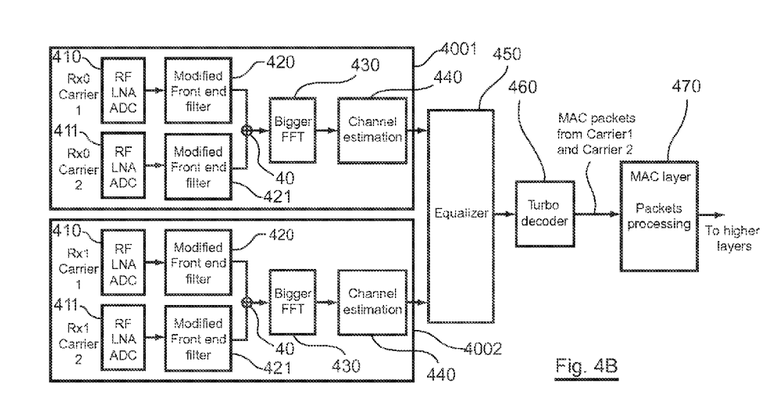
Figure 4C:
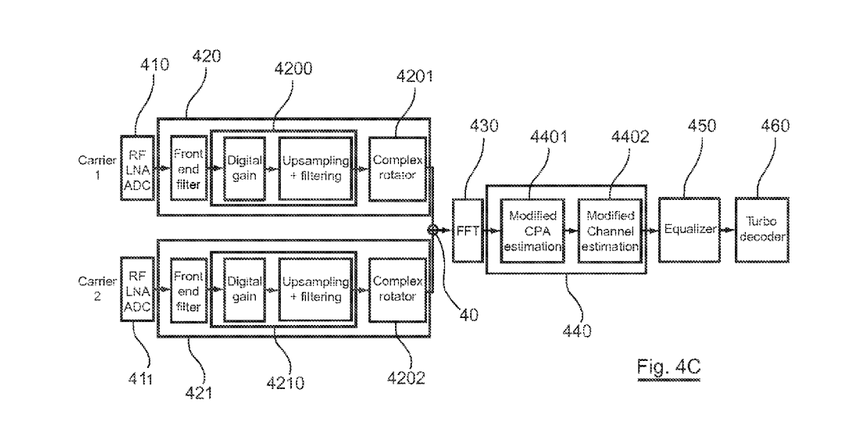

The disclosure consists in a modified arrangement, which is depicted in the FIGS. 4A to FIG. 4C.

In particular, FIGS. 4A and 4B can be compared with prior art represented by FIGS. 1A to 1B as already commented.

Considering the example of FIG. 4A, the modified arrangement comprises a "front end" before the aggregation point (referring to the part of the chain of each channel that is upstream to the aggregation point) comprising two "front end" carrier processing chains, each "front end" carrier processing chain comprising only two modules. According to the example represented on FIG. 4A, only two carriers are aggregated, but it is possible that the disclosure provides as many "front end" carrier processing chain as the number of carriers to aggregate per receiving antenna.

Each "front end" carrier processing chain of modules comprises for example a first module (410 and 411) comprising a receiving antenna and radio frequency (RF) means for analog processing, a low-noise amplifier LNA, and an analog-to-digital converter ADC, a second module (420 and 421) comprising a "modified front end" filter.

After the aggregation point, the proposed disclosure implements a single "back end" processing chain comprising a third module 430 implementing a Fast Fourier Transform FFT managing the OFDM transmission. In comparison with the FFT implemented according to the prior art represented by FIG. 1A, the FFT of the disclosure is bigger and able to process as many data as the number of data comprised in the aggregated carriers. Thus, considering the examples with two carriers represented in FIG. 1A and in FIG. 4A, the FFT of the disclosure is two times bigger than the FFT of the prior art.

The subsequent modules of the single "back end" processing chain corresponding to the fourth module 440 for the channel estimation, the fifth module 450 comprising an equalizer, and the sixth module 460 comprising a turbo decoder, are of the same dimension as the FFT implemented by the third module 430. In other terms, the subsequent modules are also able to process as many data as the number of data comprised in the aggregated carriers, the aggregating point being situated before the bigger FFT implemented by the third module 430.

FIG. 4B represents more particularly, the arrangement of the disclosure that is implemented in a receiver according to the disclosure using two antennas (Rx0 and Rx1). In this case, two antenna chains (4001, 4002) are implemented, and for each antenna, the "modified front end" according to the disclosure comprises only the first and the second modules since the aggregation point is implemented before the third module 430 implementing the "bigger FFT", whose dimension is equal to the number of data comprised in the aggregated carriers.

Thus, in comparison with the prior art represented by FIG. 1B using two antennas, the proposed disclosure permits to use only one module per antennas for performing an FFT, instead of two in the prior art. The same reduction is obtained for the channel estimation module. In addition, the proposed disclosure implements only a single fifth module 450 comprising an equalizer, and a single sixth module 460 comprising a turbo decoder to process all the aggregated data of the aggregated carriers of each antenna chain (4001, 4002) before entering the MAC layer level 470.

Consequently, moving the aggregation point according to the disclosure, which leads to modify the "front end" and the "back end" permits according to the embodiment represented on FIG. 4B and using two antennas, to use only fifteen modules whereas twenty-one are necessary according to the prior art. Such a reduction permits to save space, since even if the third, fourth, fifth and sixth modules are able two process more data, their physical size is less when considering the multiplication of each module necessary for processing each carrier according to the prior art of FIG. 1B.

Thus, the invention results in a more efficient implementation compared to the prior art, since it is more flexible in terms of aggregation capabilities.

Thus, according to the disclosure, all the modules performing the FFT, equalization, etc. up to the turbo decoder are mutualized in order to process a total aggregated bandwidth of 100 RBs for example. Under this scheme, a single baseband design capable of processing N=100 RBs is sufficient to support any B=20 MHz carrier aggregation split, permitting to save area and power consumption due to the duplication of all the PHY layer modules involved in the prior art.

FIG. 4C is a detailed representation of the "modified front end" according to the disclosure.

In comparison, with FIG. 1C of the prior art, the key points in "the modified front end" according to the disclosure is the insertion of additional means (4200, 4210) in the "modified front end filter" of the second module (420, 421) of FIGS. 4A and 4B. These additional means (4200, 4210) consist of digital gain means and oversampling (or upsampling) and filtering means.

Figure 5:
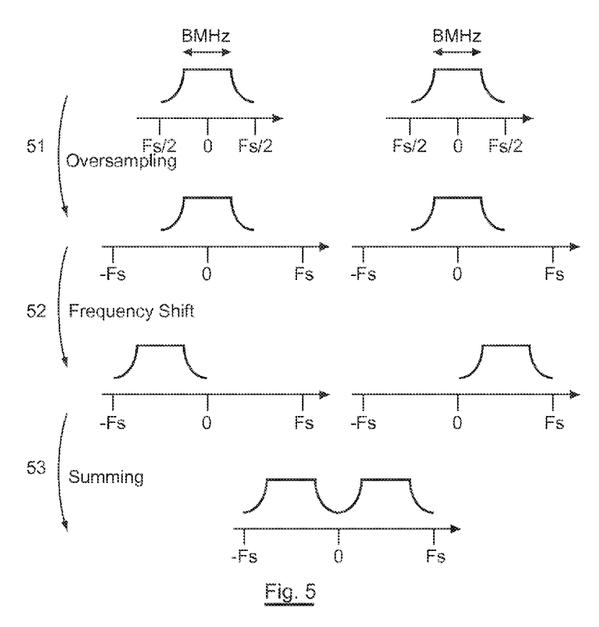
FIG. 5 represents the main steps of the method of the disclosure according to the first embodiment of the disclosure.

FIG. 5 represents the steps, which are implemented by the "modified front end" according to the disclosure.

Indeed, according to FIGS. 4C and 5, to shift the aggregation point (40) from the MAC layer level to the PHY layer level, the signals from each carrier are upsampled (51) at a higher rate (the filtering means are just here to avoid images due to the oversampling, which is a classical operation in oversampling) such a higher rate is called in the following the "mother sampling rate".

Thanks to such an operation of oversampling (51), signals that are sampled at a frequency that would correspond to the natural sampling frequency of a unique carrier of bandwidth B are obtained.

Then, according to the disclosure, the carriers are then aggregated together by shifting (52) them properly before they are added (53) together. This is performed thanks to the complex rotator which implements a digital shift (4201, 4202), which is used in the disclosure not simply to compensate for the residual frequency offset as in a classical OFDM system but also to enable the two carriers to be added in a non destructive way.

All the means, which permits to perform the three steps of oversampling 51, frequency shifting 52 and summing 53 of FIG. 5, constitute what is called the "carrier aggregation module" of the first embodiment, which implements the aggregation point and deliver properly aggregated carriers.

Thus, the complex rotator of the modified front end according to the disclosure has an additional function in comparison to the prior art.

Concerning the "modified back end", the third module 430 implements a single FFT, called "bigger FFT", whose dimension is equal to the number of data comprised in the aggregated carriers. In particular, the size of the FFT corresponds to the rate applied thanks to the oversampling means (4200, 4210), called the "mother sampling rate" corresponding to the total aggregated bandwidth. For example, if the purpose is to aggregate 10 MHz and 10 MHz (with a corresponding sampling rate equal to 15.36 MHz) then the "mother sampling rate" is for example in LTE equal to 30.72 MHz, and if the purpose is to aggregate 10 MHz, 10 MHz and 20 MHz (with corresponding sampling rates respectively equal to 15.36, 15.36 and 30.72 MHz), the "mother sampling rate" is for example in LTE equal to 61.44 MHz.

Such a single FFT is used to demodulate all the aggregated carriers simultaneously, whereas in the prior art as many FFT as carriers are required.

Thus, the disclosure permits to obtain a gain in complexity compared to the parallel FFTs required according to the prior art.

In addition, the fourth module 440 for channel estimation and timing compensation (4401) is modified according to the disclosure. Since the channel estimation and the timing error have no relation between two carriers, the modules are updated to perform their function per group of contiguous subcarriers independently (in a natural system, the operation is performed over the whole FFT size).

Timing Compensation module (or sub-module) 4401 is called in the following Common Phase Advance (CPA) and enable to manage independently the timing between carriers and permit to perform channel estimation independently over a number of frequency bandwidths corresponding to the number of carriers to aggregate.

Thus considering the whole system according to the disclosure and represented by FIG. 4C, the number of carriers that can be aggregated is a design parameter of the system and just corresponds to the number of "front end" modules (i.e., before the carrier aggregation point) that the designer decides to put in his arrangement.

Advantageously, the front end filters of the system according to the disclosure and represented by FIG. 4C, are implemented by using "polyphase" filters so that the front end filters used to manage each of the aggregated carriers can be reused and combined together to manage a single carrier with a bandwidth equal to B.

Regarding synchronization, all the classical schemes can be applied. In particular, synchronisation can be done either on preambles and/or using pilot symbols, and can be based on a single or several carriers depending on the use case.

Consequently, moving the aggregation point from the MAC layer level to the PHY layer level according to this first embodiment requires an inventive step based on:

using a modified "front end" part, the aggregation being performed at the input of an enlarged FFT whose size will correspond to that of the total aggregated bandwidth.

adapting the post FFT processing (channel estimation, equalizer, turbo decoder) considering that an equivalent channel of the total aggregated bandwidth has to be decoded per slice of contiguous subcarriers.

3. Description of a Second Embodiment and its Variants

Figure 6A:
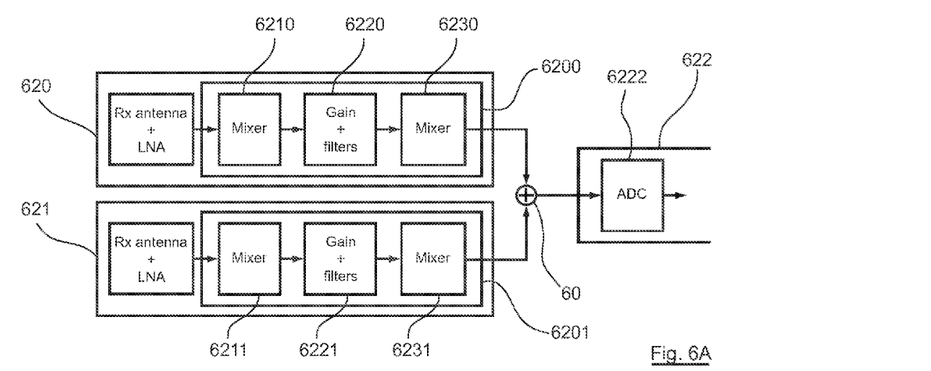
FIGS. 6A to 6C disclose the arrangement for carrier aggregation according to a second embodiment of the disclosure.

In relation with FIG. 6A, a first variant of a second embodiment of the disclosure is represented.

Such a second embodiment consists in moving the aggregation point upstream in comparison with the first embodiment of FIG. 4A to 4C. More particularly according to the second embodiment of the disclosure, the aggregation point is moved inside the first module (410, 411) of each carrier processing chain of the first embodiment.

More precisely, the aggregation point (60) is moved before the analog to digital converter module ADC 6222, which performs the oversampling step.

Thus, the carriers are aggregated in the analog domain whereas they were aggregated in a digital domain according to the first embodiment. In comparison to the first embodiment, the first module (410, 411) is splitted in a radio frequency "front end" part (620, 621) comprising only a receiving antenna, a low-noise amplifier (LNA) and radio frequency means for analog processing, and a "back end" part (622) comprising the analog to digital converter module ADC 6222, and subsequent PHY layer level modules (not represented) performing NFT and channel estimation, equalizing and turbo decoding before entering the MAC layer level. Such subsequent PHY layer level modules of the back end part are of the "bigger type" in other words are able to process as many data as the number of data comprised in the aggregated carriers, the aggregating point being located before the analog to digital converter module ADC 6222.

Since the aggregation point is implemented before the ADC, the sampling rate of the ADC according to the second embodiment corresponds to the sum of the sampling frequencies of the ADCs used in the first embodiment over the aggregated carriers, in other terms the rate of the ADC corresponding to the second embodiment is equal to the "mother sampling rate" corresponding to the total aggregated bandwidth.

Consequently, according to this second embodiment a single ADC placed in the single "back end" processing chain, is able of sampling a bandwidth of for example 20 MHz in order to sample two aggregated carriers, rather than using two ADCs operating independently at 10 MHz and placed in each "front end" carrier processing chain.

If more than two carriers are used according to another example, the second embodiment represented on FIG. 6A requires the use of only one ADC placed after the aggregation point (per receiving antenna Rx), whereas according to the first embodiment represented in FIGS. 4A to 4C the number of implemented ADCs, placed before the aggregation point, is a multiple of the number of carriers (in FIG. 4C since two antennas and two carriers are used the number of ADCs is equal to four).

In this first variant of the second embodiment the frequency shift used previously to make the aggregated carriers adjacent is performed by the RF means (6200, 6201) of the front-end carrier processing chains (620, 621).

Regarding FIG. 6A, each set of RF means (6200, 6201) according to the second embodiment comprises a first mixer (6210, 6211) placed before the gain and filter means (6220,

6221) and a second mixer (6230, 6231) situated after the gain filter of each "front end" carrier processing chain per receiving antenna Rx.

The term "mixer" refers in particular to an analog complex multiplier, which is able to perform frequency shift on an analog signal.

In particular, according to the second embodiment represented in FIG. 6A, the first mixer (6210, 6211) is classical and converts the modulated signal to a baseband signal. The second mixer (6230, 6231), according to the second embodiment of the disclosure, is furthermore used to introduce a step of frequency shifting the carriers that was previously inserted in the digital domain according to the first embodiment. The frequency shift performed by the second mixer (6230, 6231) permits to shift the signal of each carrier in order to avoid a destructive recombination of them.

Thus, according to this second embodiment, the frequency shift of the carriers is applied to analog signals whereas it was applied to digital signals according to the first embodiment.

Then the summing step 60 is performed before entering into the analog to digital converter ADC 6222, which applies the oversampling step.

Figure 6B:
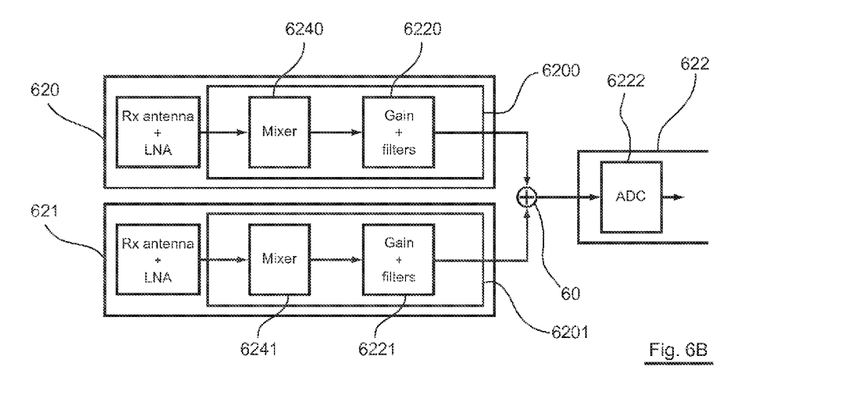

A second variant of the second embodiment is represented in relation with FIG. 6B. According to this second variant, a single mixer (6240, 6241), with a modified configuration, especially configured for both converting to baseband and frequency shifting each carrier of the modulated signal is placed before the gain and filter means (6220, 6221) of each "front end" carrier processing chains (620, 621).

Thus, such a modified mixer (6240, 6241) permits to save the second mixer that is implemented according FIG. 6A, which helps again to reduce the size of the RF chipset comprising the set of RF means (6200, 6201) of each carrier processing chain (620, 621) per receiving antenna Rx.

Figure 6C:
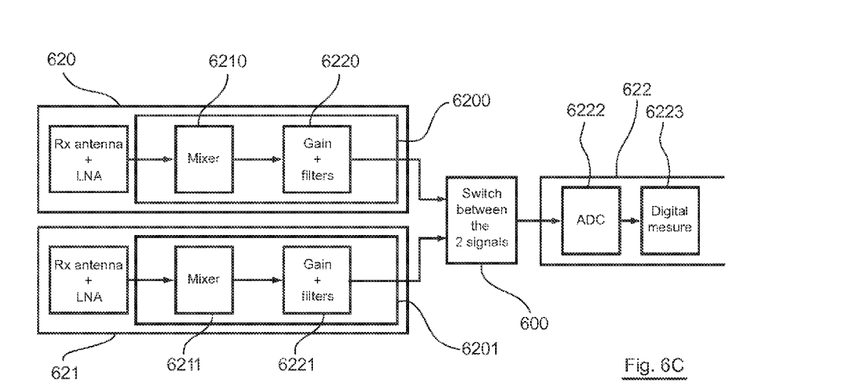

A third variant of the second embodiment is represented in relation with FIG. 6C. According to this third variant, an RF switch 600 is implemented to perform the summing step.

More precisely, according to this third variant, the set of RF means (6200, 6201) of each carrier processing chain (620, 621) comprise only one mixer, which is the same mixer as the first mixer (6210, 6211) used in the first variant of the second embodiment, and which permits to convert each carrier to baseband.

Then, the RF switch 600 is used to select alternatively between for example the first and the second carrier as represented on FIG. 6C, in order to add them together, by multiplexing them, while avoiding destruction of a part of the two carriers and to deliver multiplexed aggregated carrier at the input of the analog to digital converter (ADC) (6222).

Indeed, as illustrated by the example further detailed, said RF switch has:
- as many inputs as the number of carrier to aggregate,
- one output for delivering said set of aggregated signals of said plurality of carrier processing chains, said RF switch operating at a predetermined rate depending on the aggregated bandwidth of said set of aggregated signals of said plurality of carrier processing chains, and said RF switch being able to select one sample of one of said inputs according to a predetermined periodic sequence for building said output.

The sampling step is then performed by the analog to digital converter ADC 6222.

Then, an additional post processing digital operation is performed by a digital module 6223 to demultiplex data for example.

This arrangement according to the third variant of the second embodiment is easier to implement in practice since it requires less modification of the involved modules belonging to the "front end" or "back end" part.

However, such third variant requires specific ratios between the aggregated bandwidth to enable an efficient switch 600: the bandwidth of each aggregated carrier shall be an integer fraction of the total aggregated bandwidth.

For instance, considering for example two first carriers with a bandwidth B/4 and a third carrier with a bandwidth B/2, the switch works as it is described in the following.

First, the <<mother sampling rate>> of the ADC is equal to B, and the corresponding period is equal to T=1/B, the two first carriers with a bandwidth B/4 can be represented as $c1(n*4T)$ and $c2(n*4T)$, and the third carrier with a bandwidth B/2 can be represented as $c3(n*2T)$.

The RF switch 600 of the third variant switches between I and Q components of each carrier during one quarter of the time for the first carrier c1, one quarter of the time for the second carrier c2, and one half of the time for the third carrier c3 to produce a signal $c(mT)$ m, being an integer, sampled at B MHz with:

$c(4mT)=c3(2m*2T)$
$c(4mT+T)=c1(m*4T)$
$c(4mT+2T)=c3(2m+1)*2T)$
$c(4mT+3T)=c2(m*4T)$

It is then possible that the above example can be extended to other cases of aggregation while respecting the specific ratios required for an efficient switch.

To summarize, according to all the three variants of the second embodiment presented above, only one ADC operating at the mother sampling rate is used which is much more flexible and efficient in terms of power consumption and die size that for instance two ADCs operating at half the mother frequency.

4. Modified "Back End" of a System with Four Receiving Antennas

The general principle of the disclosure can be applied in order to provide a User Equipment (UE), which is able to implements more than two receiving antennas, for example four receiving antennas.

Indeed, by default, an LTE (or WiMAX) receiver embeds two receiving antenna chains, as described in the above description, each one supporting a bandwidth B.

On top of this, LTE defines another category of UE capable of supporting four receiving antennas.

The following part presents how the disclosure proposes a way to reconfigure the system arrangement so that it is able to support reception of four receiving antennas provided that the aggregated bandwidth per antenna is smaller than B/2.

This way the reconfigurable arrangement according to the disclosure can efficiently handle for example any of the following splits assuming that the blocks are initially dimensioned to support a bandwidth B with two receiving antennas:
- N carriers with total aggregated bandwidth equal to B over two receiving antennas,
- N carriers with total aggregated bandwidth equal to B/2 over four receiving antennas,
- N1 carriers with total bandwidth B1 over two receiving antennas and N2 carriers with total bandwidth B2/2 over four receiving antennas, each bandwidth B1 and B2/2 respecting the following relation: B1+B2/2=B.

In order to simply manage the two additional antennas, the arrangement is configured so that the two groups of two antennas are considered as two aggregated virtual carriers.

Figure 7A:
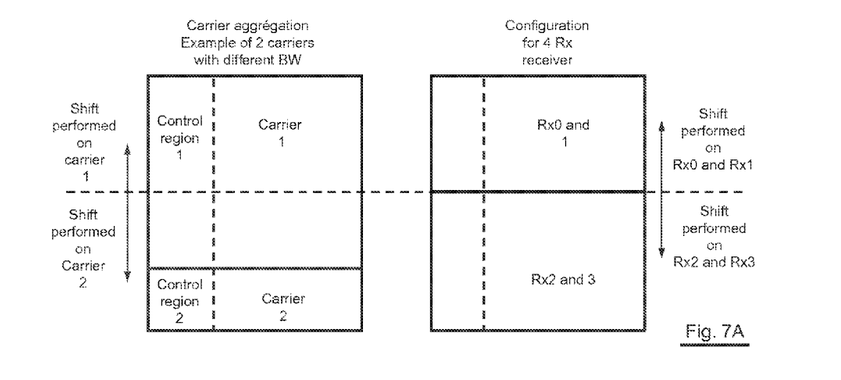
FIGS. 7A to 7C disclose the means implemented by the modified "back end" when considering a system according to the disclosure with four receiving antennas.

In order to manage four receiving antennas, the disclosure considers the two additional receiving antennas (antennas Rx2 and Rx3) as corresponding to a second aggregated carrier, as represented on FIG. 7A.

Thus, both signals are converted to baseband and the frequency shift to be used is obvious as illustrated on FIG. 7A. Indeed, the frequency bandwidths corresponding to antennas Rx0 and Rx1 are shifted in the first half of the aggregated bandwidth, whereas the frequency bandwidths corresponding to antennas Rx2 and Rx3 are shifted in the second half of the aggregated bandwidth.

The frequency shift for such a system comprising four receiving antennas can be applied according to the first or the second embodiment as described above.

In addition, to the previous operations implemented to aggregate the carrier regardless of the chosen embodiment, some modifications have to been applied to the "back end" of the OFDM arrangement to manage efficiently and simply the carriers aggregated when the systems comprises four receiving antennas, once the received carriers are aggregated.

Indeed, considering a classical OFDM arrangement, several physical channels are multiplexed in time and frequency:
control channels convey control information that is necessary to decode the useful data (and to know that there is data to decode)
data channels convey the actual messages
For instance:
in LTE, several control channels are defined:
the PBCH carries information on the channel and is a broadcast channel,
the PDCCH carries information on the data allocation and is a control channel,
the PDSCH carries the actual messages that are described by the PDCCH channels and comprises unicast data,
in WiMAX:
the DL MAP describes the data allocations (as the PDCCH in LTE) while the UL MAP describes the burst allocations
the DL (Down Link) and UL (Up Link) burst contains the data message as described by the MAP.

Indeed, in classical WiMAX or LTE systems (actually most systems) control and data signals are multiplexed in the transmitted signal. There can be one or several control regions (e.g. one control signals to describe the multiplexed signals, one control signal to manage the transmission power, one control signal to manage the hybrid automatic repeat request (HARQ) process, etc. . . . ) and there can be one or several data regions (e.g. unicast data region, broadcast data region, multicast data regions). Each region deserves a specific decoder.

In addition, as already described in relation with FIGS. 1A to 1C, a classical typical OFDM receiver comprises:
a channel estimation block
an equalizer
one or several decoders to decode the messages on the various logical channels.

Figure 7B:
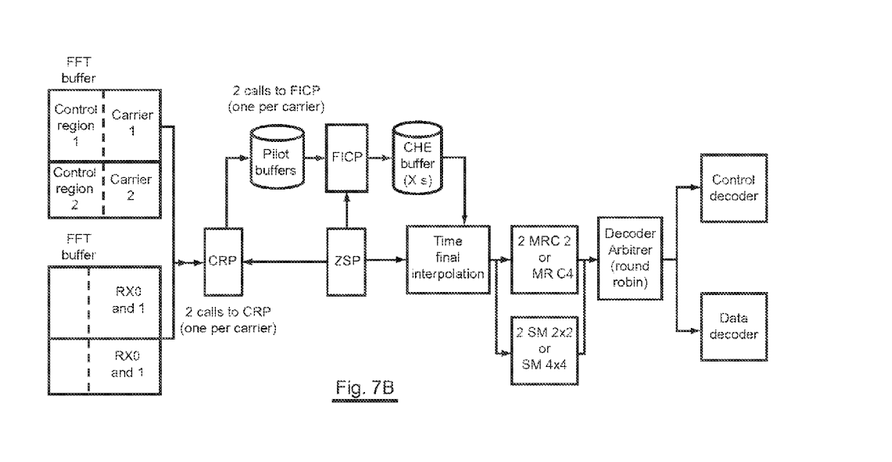
Figure 7C:
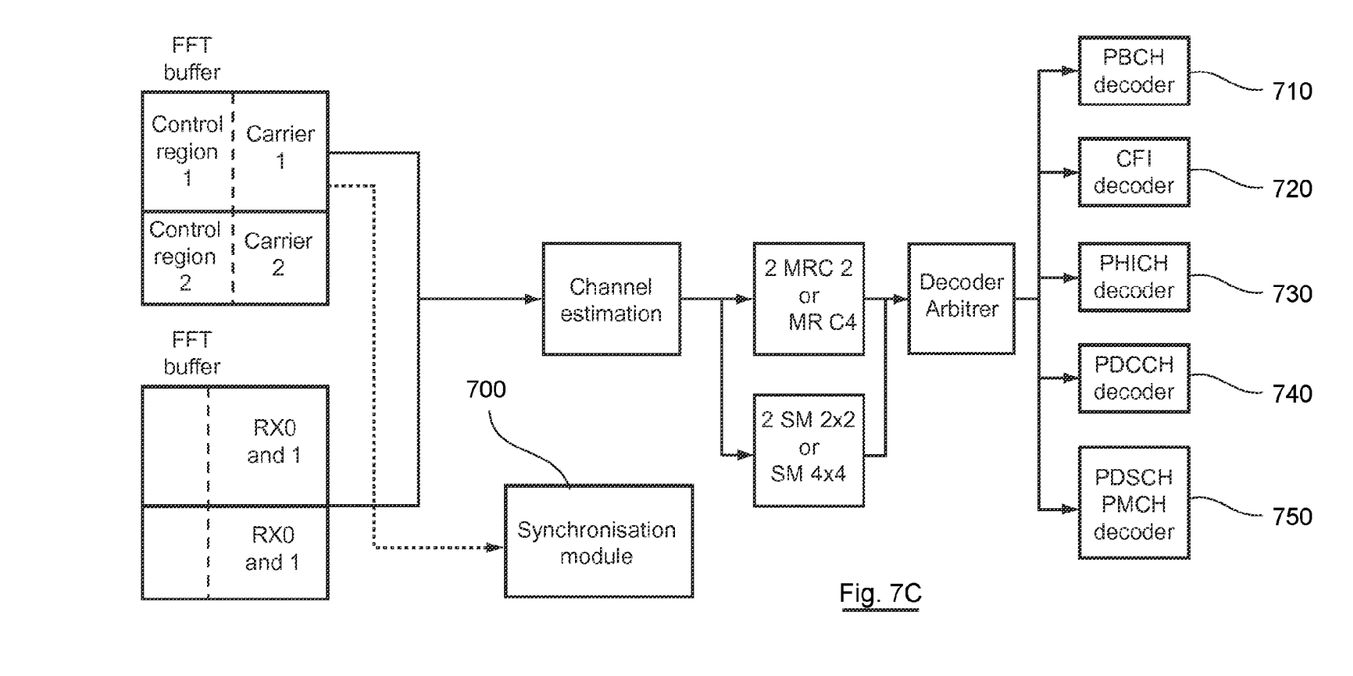

This is illustrated in FIG. 7C in the case of an LTE receiver where five decoders (710, 720, 730, 740, 750) in parallel are implemented corresponding to the five types of physical channels in LTE. A synchronization module 700 is used to perform time and frequency synchronization. FIG. 7B represents the case of a classical OFDM receiver (WiMAX or LTE) comprising different types of equalizers (MRC2 when two receiving antennas are considered and MRC4 when four receiving antennas are considered).

Provided that the "front end" has gathered all the information in a single aggregation of carriers demodulated and delivered at the FFT output as described before in relation with the first or the second embodiment of the disclosure, it is possible to have an efficient and flexible arrangement for the rest of the receiver as well.

Indeed, considering the classical OFDM structure of the receiver, the data at the FFT input are considered according to the disclosure as "a virtual single carrier" system with total number of resource blocks corresponding to the number of aggregated resource blocks.

This is key to manage efficiently the data to be decoded when considering for example four receiving antennas.

Thus, as already mentioned in relation with the first or the second embodiment, it is then possible to adapt the dimension of the "back-end" modules efficiently in order to manage this "virtual single carrier" in other word to support a bandwidth B, not more while staying capable of supporting any carrier aggregation split.

The first "back end" module modified according to the disclosure is the channel estimation module 440 in relation with FIGS. 4A to 4C. Indeed, the channel estimation module needs to be modified to support the processing of the bandwidth by slides of contiguous resource blocks starting from some offset in the virtual carrier memory. Since according to the disclosure, the channel estimation means have to process "bigger" FFT symbol, they are required to be able to process it by successive slices, in order to manage the side effects caused by discontinuities between carriers.

The second "back end" module modified according to the disclosure comprises the control region decoders 460 in relation with FIGS. 4A to 4C. The control region decoders 460 implements the decoding of the aggregated data outputted by the FFT module to search for the control information specifying in particular the data allocations.

In LTE for instance, the control channel decoder corresponding to the decoder of the data allocation messages (PDCCH decoder) needs to be modified to be able to search for PDCCH information among all the FFT outputs, taking into account that it corresponds to aggregated data from several carriers rather than to a single carrier.

Such a modification involves signalizing the starting resource block offset and the dimension in numbers of resource blocks of the search information, which is slightly different from a PDCCH classical decoder for which there is no signalisation of the starting resource block offset. Indeed, in the classical LTE, there is one PDCCH per carrier, which explains why no additional information is necessary.

Thus in the system according to the disclosure, all the decoders for decoding all the other control channel information need to be modified similarly (signalisation of the starting resource block offset and numbers of resource blocks of the searched information) as described in the following.

For instance in LTE, for the PBCH (the channel carrying the information about the carrier), the classical decoder is modified to be able to retrieve a PBCH anywhere in frequency in the virtual allocation (and not in the middle as in a classical LTE system) by signalisation.

Thus, it is possible to get the PBCH information on any of the aggregated carriers. Therefore thanks to the arrangement according to the disclosure, it is possible to use a single PBCH decoder, which constitutes a gain compared to a classical PHY arrangement using as many PBCH decoders as there are some carriers.

The PDSCH decoder is the decoder for the data channel and requires implementing HARQ combining (using an HARQ memory which is usually dimensioned proportionally to the bandwidth to process) and a supplemental turbo decoding. Thanks to the "front end" according to the disclosure regardless of the chosen embodiment, this decoder is only slightly modified to manage several carriers.

Indeed, the modifications that are not natural are the following ones: since data allocations on several carriers can be considered as several burst in a virtual carrier, the decoder needs to be modified to support several contexts corresponding to the decoding of several bursts in parallel.

Thus the turbo decoder (which is a huge module in a modem) just needs to be able to process the bandwidths B, and the HARQ memory just needs to be dimensioned based on the bandwidth B of the total aggregated carriers.

The synchronisation modifications according to the disclosure are then studied below.

Indeed, in classical OFDM systems, some synchronization channels made of known preamble sequences are defined, for example in LTE, the PSS and SSS channels, and in WiMAX, a preamble is used. But, in a context of carrier aggregation, the classical systems may require the duplication of the synchronization modules (one per aggregated carrier). Using the arrangement according to the disclosure avoids duplicating the synchronization modules or applying such constraints, since synchronization on one of the aggregated carriers, known as the serving carrier, may be enough in some deployment scenarios considering that all the carriers are aggregated before entering the FFT module.

Indeed, with the proposed arrangement, just a single synchronisation module is used whereas several in the PHYs layers were needed in the classical systems.

According to a variant, if a synchronization is required for all the carriers, the proposed disclosure proposes to insert a similar signalisation as depicted above permitting to find a synchronization channel information anywhere in the band (and not just in the middle as it is the case in a classical receiver).

Concerning the equalizer, in a classical receiver, the equalizer shall support a maximum ratio combiner to combine the information of the two receiving antennas over a bandwidth B.

In the arrangement according to the disclosure, the equalizer is modified to support four receiving antennas over a bandwidth B. This can be done by processing independently the two first antennas (Rx0 and Rx1) and then the two other antennas (Rx2 and Rx3) and then summing them together.

What is claimed is:

1. User equipment for receiving an Orthogonal Frequency-Division Multiplexing (OFDM) signal, said user equipment comprising:
   a Physical layer (PHY) processing subsystem comprising:
      a plurality of carrier processing chains,
      a carrier aggregation module configured to aggregate signals received on each carrier processed by said plurality of carrier processing chains and to deliver a set of aggregated signals of said plurality of carrier processing chains, said carrier aggregation module comprising at least one frequency shifter, which shifts the signals received on each carrier to produce shifted signals that are adjacent, an adder, which adds the shifted signals and at least one oversampler, which oversamples the signals received on each carrier either prior to the received signals being shifted by the frequency shifter or after the received signals are shifted by the frequency shifter and aggregated by the adder, the carrier aggregation module delivering said set of aggregated signals of said plurality of carrier processing chains, and
      a Fast Fourier Transform module having an input, which receives the delivered set of aggregated signals, said Fast Fourier transform (FFT) module being configured to process a size of data according to a predetermined rate depending on an aggregated bandwidth of said set of aggregated signals of said plurality of carrier processing chains delivered by the carrier aggregation module.

2. The user equipment for receiving an OFDM signal according to claim 1, wherein the carrier aggregation module comprises:
   a number of oversamplers which is at least equal to the number of carriers to aggregate, each of said oversampler delivering an oversampled signal for each carrier;
   a number of frequency shifters which is at least equal to the number of carriers to aggregate, each of said frequency shifter delivering a frequency shifted signal for each carrier from said corresponding oversampled signal of each carrier;
   and wherein said adder adds said shifted carriers and delivers the set of aggregated signals of said plurality of carrier processing chains, and
   and wherein said oversamplers, shifters and adder process digital signals of each carrier.

3. The user equipment for receiving an OFDM signal according to claim 1, wherein said carrier aggregation module comprises:
   said adder which adds analog carriers, delivering a set of analog aggregated signals of said plurality of carrier processing chains,
   an analog to digital converter, delivering a set of digital aggregated signals of said plurality of carrier processing chains, and being configured to process a bandwidth according to the predetermined rate depending on the aggregated bandwidth of said set of aggregated signals of said plurality of carrier processing chains.

4. The user equipment for receiving an OFDM signal according to claim 3, wherein said carrier aggregation module comprises a number of frequency shifters, which is at least equal to the number of carriers to aggregate, each of said frequency shifters delivering a frequency shifted analog carrier to the adder.

5. The user equipment for receiving an OFDM signal according to claim 4, wherein each of said frequency shifters is a mixer, which implements an analog frequency shift.

6. The user equipment for receiving an OFDM signal according to claim 4, wherein each of said frequency shifters is able to both implement an analog shift and to convert a signal of a carrier to baseband.

7. The user equipment for receiving an OFDM signal according to claim 1, wherein said carrier aggregation module comprises a Radio Frequency (RF switch, said RF switch having:
   as many inputs as a number of carrier to aggregate,
   one output for delivering said set of aggregated signals of said plurality of carrier processing chains,
   said RF switch operating at a predetermined rate depending on the aggregated bandwidth of said set of aggregated signals of said plurality of carrier processing chains,
   and said RF switch being configured to select one sample of one of said inputs according to a predetermined periodic sequence for building said output.

8. A method for receiving an Orthogonal Frequency-Division Multiplexing (OFDM) signal implemented by user equipment, said user equipment comprising a Physical layer (PHY) processing subsystem, which comprises a plurality of carrier processing chains,
   wherein said method comprises:
      a carrier aggregation step, aggregating carriers of each carrier processed by said plurality of carrier processing chains, said carrier aggregation step comprising at least one frequency shifting of said carriers, making the carriers adjacent, adding signals received on each adjacent carrier, and oversampling the signals received on each carrier, either prior to the carriers being frequency shifted or after the received signals are frequency shifted and added, said carrier aggregation step delivering a set of aggregated signals of said plurality of carrier processing chains, a Fast Fourier Transform step having an input which receives the set of aggregated carriers and being implemented by a PHY layer processing subsystem of said user equipment, said Fast Fourier transform step processing a size of data according to a predetermined rate depending on an aggregated bandwidth of said set of aggregated carriers of said plurality of carrier processing chains delivered by the carrier aggregation step.

9. A non-transitory computer-readable support comprising a computer program product stored thereon comprising program code instructions for implementing a method for receiving an Orthogonal Frequency-Division Multiplexing (OFDM) signal implemented by a user equipment when executed by a processor, said user equipment comprising a Physical layer (PHY) processing subsystem, which comprises a plurality of carrier processing chains, wherein the program code instructions comprise:

instructions configured to process a carrier aggregation step, aggregating carriers of each carrier processed by said plurality of carrier processing chains, said carrier aggregation step comprising at least one frequency shifting of said carriers, making the carriers adjacent, adding signals received on each adjacent carrier, and oversampling the signals received on each carrier, either prior to the carriers being frequency shifted or after the received signals are frequency shifted and added, said carrier aggregation step delivering a set of aggregated carriers, instructions configured to receive the set of aggregated carriers at an input of a Fast Fourier Transform step of a PHY layer processing subsystem of said user equipment, said Fast Fourier transform step being configured to process a size of data according to a predetermined rate depending on the aggregated bandwidth of said set of aggregated signals of said plurality of carrier processing chains delivered by the carrier aggregation step.

* * * * *